J. HOLLINGSWORTH.
Horse Rake.
No. 41,433.
2 Sheets—Sheet 1.
Patented Feb. 2, 1864.
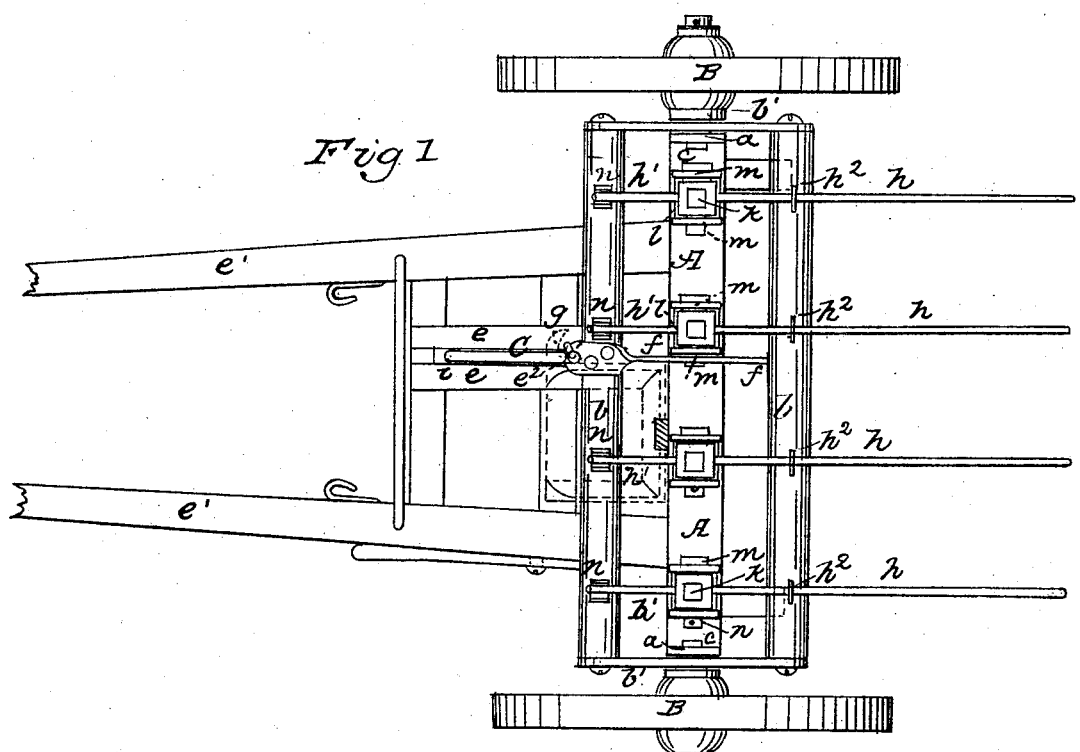
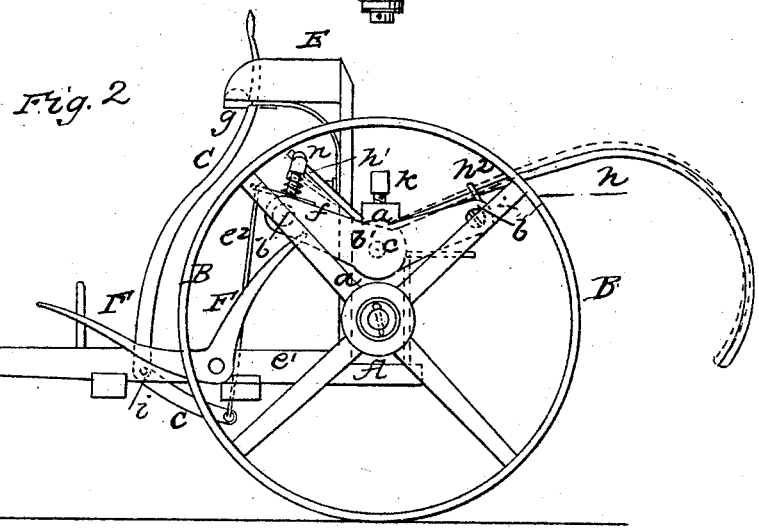

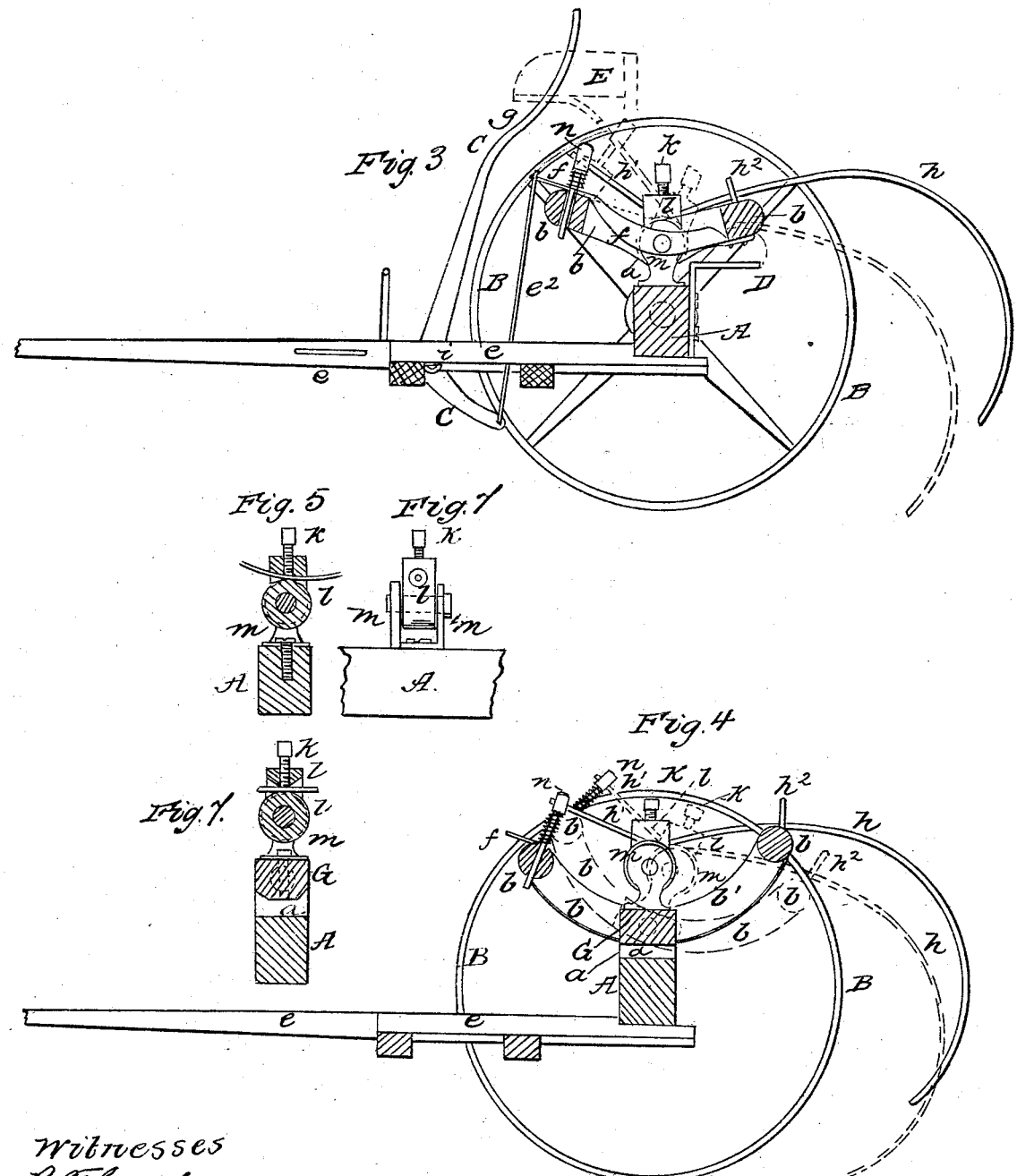

UNITED STATES PATENT OFFICE.

JAMES HOLLINGSWORTH, OF CHICAGO, ILLINOIS.

IMPROVEMENT IN HORSE-RAKES.

Specification forming part of Letters Patent No. 41,433, dated February 2, 1864.

*To all whom it may concern:*

Be it known that I, JAMES HOLLINGSWORTH, of Chicago, county of Cook, and State of Illinois, have invented certain new and useful Improvements in Wheel-Rakes; and I do hereby declare that the following is a full, clear, and exact description thereof, reference being had to the accompanying drawings, making a part of this specification, in which—

Figure 1 is a top view of the improved machine, representing the driver's seat in its position in red lines. Fig. 2 is a side elevation of the same, representing the rake-teeth in an elevated position. Fig. 3, Sheet 2, is a longitudinal sectional elevation of the improved machine, showing the rake-teeth in their elevated and depressed positions. Fig. 4, Sheet 2, shows in a longitudinal sectional elevation the rake-teeth applied to a rocking frame, which is a modification of the frame of Figs. 1, 2, and 3. Figs. 5 and 6 show the construction of the independent bearing-boxes for the rake-teeth. Fig. 7 is a vertical cross-section of one of the bearing-boxes arranged as shown in Fig. 4.

Similar letters of reference indicate corresponding parts in the several figures.

My invention relates to certain new and useful improvements in wheel-rakes, described and represented as follows:

In the accompanying drawings, A represents the axle-tree, which is mounted on wheels B B; and $a\,a$ are standards, which are rigidly secured to the ends of the axle-tree and project up perpendicularly therefrom, so as to form bearings for the ends of a rocking frame, as shown in Figs. 1 and 2. This rocking frame consists of two or more parallel bars, $b\,b$, which are secured to side plates, $b'\,b'$, that have short axles $c\,c$ projecting from them and through the standards $a\,a$. This rocking frame is thus supported above the axle-tree A, and it is rocked by means of a lever, C, which is arranged in a convenient position to the driver, who can, by vibrating this lever, raise or depress the curved ends of the rake-teeth, and thus throw the machine out of or into action at pleasure. The lever C is shown clearly in Figs. 1, 2, and 3. It is pivoted at $i$ between the two longitudinal beams $e\,e$ of the frame of the thills $e'\,e'$, which latter are secured to the lower side of the axle A. The lever C is bent, as shown in Figs. 1, 2, and 3, and connected by means of a rod, $e^2$, to the forward side of the rocking frame, or to the projecting end of a rocking brace, $f$, which extends across this frame and forms a support for the bars $b\,b$ near their centers, as shown in Fig. 3. The driver's seat E has a hooked catch, $g$, (shown in red, Fig. 1,) projecting from its right-hand side, behind which the driver puts the upper end of the lever C when he desires to keep the rake-teeth in an elevated position for transporting the machine from place to place. The driver's seat is secured to a standard which projects up from the axle-tree A, and on one side of this seat E, and pivoted to the left-hand thill, is a foot-lever, F, which is curved upward in such form as to act upon the forward bar, $b$, of the rocking frame and to enable the driver to keep the rake-teeth down to their work.

On the rear side of the axle-tree A are two right-angular brackets, D D, (shown in Figs. 1 and 3,) which are secured to the axle-tree by bolts that pass through vertical slots in the upright portions of the brackets. By loosening the screws or bolts the brackets may be adjusted up or down and again fixed in any desired position. The object of these adjustable brackets is to check the downward movement of the rear side of the frame, upon which the rake-teeth bear, in order to prevent the ends of said teeth from being forced into the ground. The brackets D D can be adjusted so that when the rear bar, $b$, of the rocking frame strikes them the ends of the rake-teeth will have been depressed as far as desired. I have thus given a general description of the construction of the frame of the machine and of some of its working parts, which may be modified and adapted to suit the various contingencies which may arise in practice.

Each one of the rake-teeth $h$ is constructed with an extension, $h'$, on its forward end, which forms an obtuse angle with the curved or rear portion, as shown in Figs. 2 and 3. These teeth are applied to the machine in the following manner: The angle or abruptly bent portion of each tooth $h$ is confined by means of a set-screw, $k$, in a rocking block, $l$, as shown clearly in Figs. 5 and 7, which block is supported in bearing-plates $m\,m$, that are rigidly bolted to the top of the axle-tree A, and the extended end $h'$ of the tooth is supported in a forked bearing, $n$, which is applied to the forward bar, $b$, of the rocking frame, and projects up from this frame a suitable distance to cause the curved portion of the tooth to rest upon the rear bar, $b$, of the rocking frame, as shown in Fig. 2, at which point the tooth passes through a staple, which keeps it in its place and prevents it from being moved laterally out of position. This staple $h^2$ is, however, long enough to allow the tooth to play vertically in it. Each tooth is constructed and applied to the machine in this way, whatever may be the number of teeth employed, and each tooth is confined to its respective rocking block $l$, and supported on each side of these blocks by the bars $b\ b$ of the rocking frame. By this application of the teeth to the machine they all have independent central rocking bearings on the axle-tree A, which will allow the curved portion of each tooth to rise or spring up, when its extreme end presses upon the ground, independently of the movement of the rocking frame or the natural spring motion of the tooth, and while this is the case each tooth will be rigidly fixed in its respective rocking bearings. The axes of the rocking blocks $l$ all coincide with each other, and also in the case of Figs. 1, 2, and 3 with the axis of motion of the rocking frame, so that this latter frame and all the blocks $l$ will rock together in raising or depressing the rake-teeth; still, as I have stated before, these blocks $l$ can be moved, one or all, independently of the rocking frame. This independent movement takes place when from any cause one or more of the teeth press too hard upon the ground; then the blocks $l$ of these teeth will allow them to rise in proportion to the obstruction to be surmounted. The forward ends, $h'$, of the teeth $h$ serve as springs to keep the rear portions of the teeth down on the bar $b$, (rear bar,) and if any additional elasticity is required, the shanks of the forked bearings $n$ may be applied to the bar $b$ of the rocking frame, as shown in Figs. 3 and 4, and helical springs applied to these forks, so that the latter will yield when an undue upward pressure acts upon the rear portions of the teeth; or, instead of allowing the forks $n$ to yield in this way, they may be screwed into the head $b$, so that they may be adjusted thereon for increasing or diminishing the force of the spring-extension $h'$. The principal advantage of thus allowing one tooth to yield independently of the other and with greater or less freedom than the other is that in tempering rake-teeth they do not always retain a uniform shape, and without the independent spring or adjustable bearing for each tooth they cannot be brought to exert an equal pressure, and some of the teeth would be loose and rattling, while others would be "strung" too tight, some might lose their hold, while others would scrape into the ground; but when the teeth are constructed and applied to the machine as above described their lower or raking ends can all be arranged in the same horizontal line, so that all will work together, and so that all the teeth will have a uniform tension.

In Figs. 4 and 7 I have shown a modification of the arrangement above described, which consists in hanging the rocking frame in the end bearings, $a\ a$, and applying the blocks $l$ directly to a bar, G, extending across this frame, instead of applying them to the axle-tree A, so that the friction occasioned by all the joints of the blocks $l$ when the rocking frame is moved is obviated. In this modified plan the rocking blocks $l$, which hold the rake-teeth, and the bearing-plates of these blocks all move with the frame, and the friction is reduced to the two end bearings of this frame. Thus it will be seen that while all the features described of hanging and adjusting the rake-teeth are preserved I avoid a great deal of friction and enable the operator to move the rocking-frame with ease.

The rocking frame which I employ may be more or less depressed in the center—i. e., the front and rear bars, $b\ b$, may be more or less elevated above the rocking blocks $l\ l$, according to the angle which is given to the forward ends of the teeth. The rear portions of these teeth are held down on the rear bar by the pressure of the spring-extensions $h'$, or by the combined force of these extensions and the springs which are applied to the forked bolts or bearings $n$. When it is not desired to use spring-forks, they can be screwed into their bar $b$ and adjusted by setting their shanks more or less into the bar. The spring-extensions $h'$ of the teeth $h$ are not held rigidly by the forks $n$, but are allowed an end-play through these forks when the raking ends of the teeth spring upward.

From this description it will be seen that I obtain all the advantages of having each tooth secured to the machine by an independent hinge-joint, and do away with the continuous shaft running through and serving as a bearing for all the joints or teeth; hence I am enabled to remove any one of the teeth and substitute another in its stead without detaching any one of the others. I also make a portion of each tooth serve as a spring for keeping the other portion down in its place, except when it meets with an obstruction, then the spring portion will yield and allow the raking portion to rise over the obstruction and then return to its former position. The hinges or joints are for the purpose of securing their respective teeth to the machine and allowing the spring-extensions to operate upon the raking portions of the teeth.

Having thus described my invention, what I claim as new, and desire to secure by Letters Patent, is—

1. The combination of a rocking frame and jointed bearings for the rake-teeth, substantially as and for the purpose set forth.

2. Sustaining the forward extensions of the rake-teeth upon bearings, substantially in the manner and for the purpose specified.

3. The adjustable forked bearings $n$ or their equivalents, substantially as and for the purposes specified.

4. The combination, with a rocking frame and adjustable brackets D D, of the extended rake-teeth $h\ h'$ and intermediate jointed bearings for said teeth, substantially as and for the purposes described.

5. Making the forward portion of each rake-tooth serve as a spring for keeping the rear or raking portion down in place, substantially as described.

JAMES HOLLINGSWORTH.

Witnesses:
T. B. BROWN,
J. D. M. MARSH.